Dec. 14, 1937.  C. F. DINLEY  2,101,840
DEGREASING APPARATUS
Filed Jan. 15, 1935   5 Sheets—Sheet 1

WITNESSES:
Hubert Fuchs
William Bell Jr.

INVENTOR:
Clarence F. Dinley,
BY Fraley Paul
ATTORNEYS.

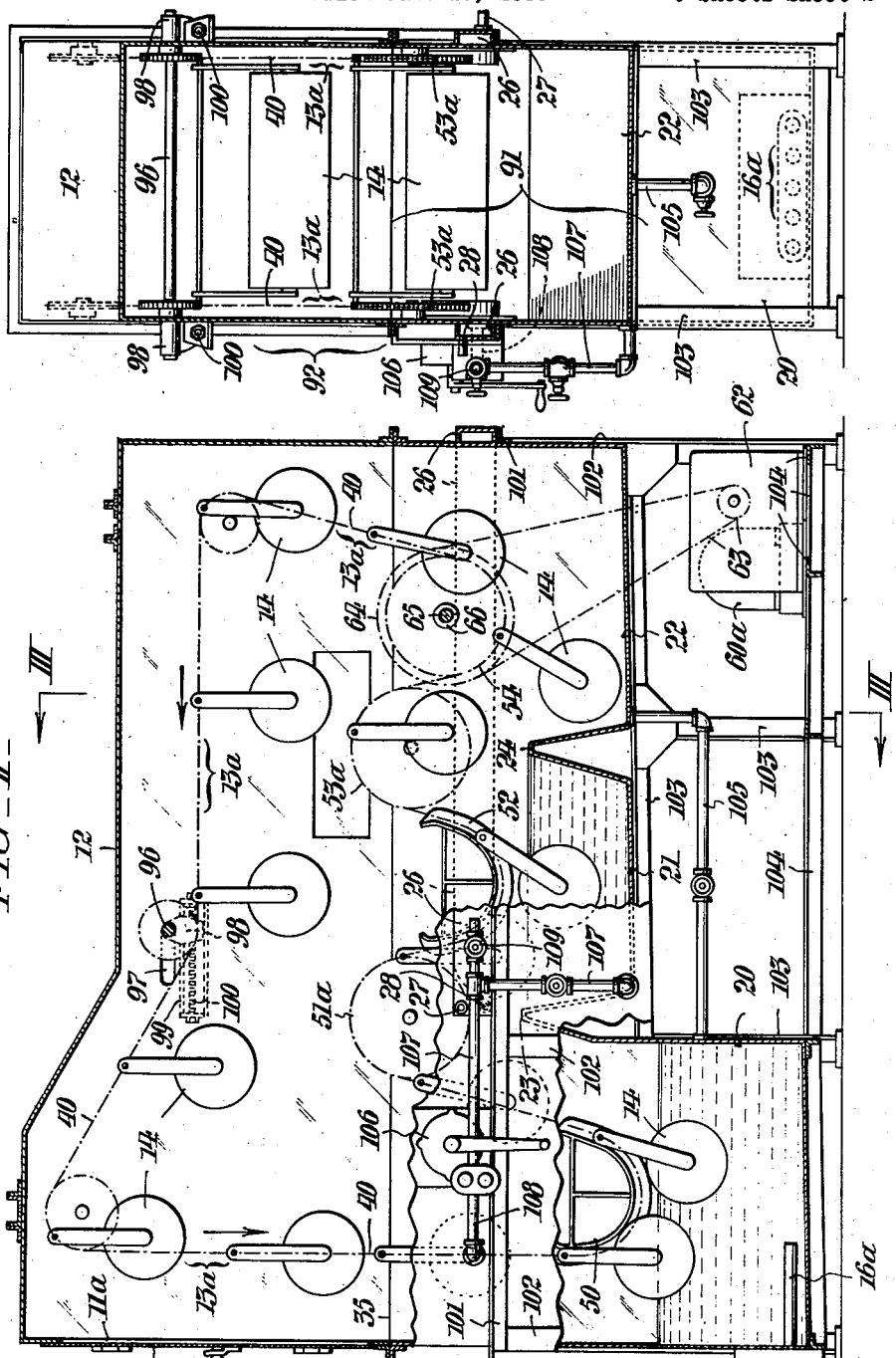

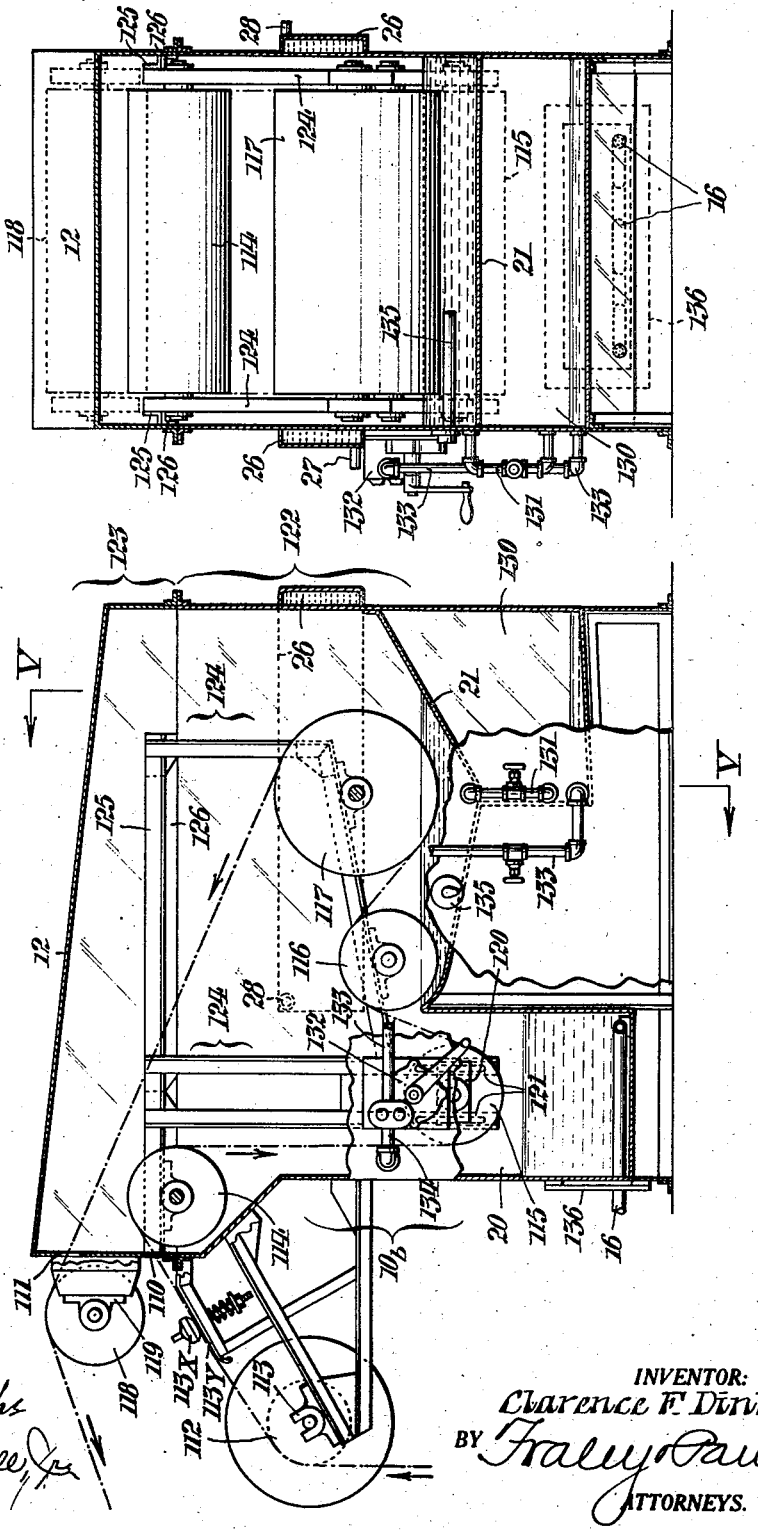

Dec. 14, 1937.  C. F. DINLEY  2,101,840
DEGREASING APPARATUS
Filed Jan. 15, 1935   5 Sheets-Sheet 4
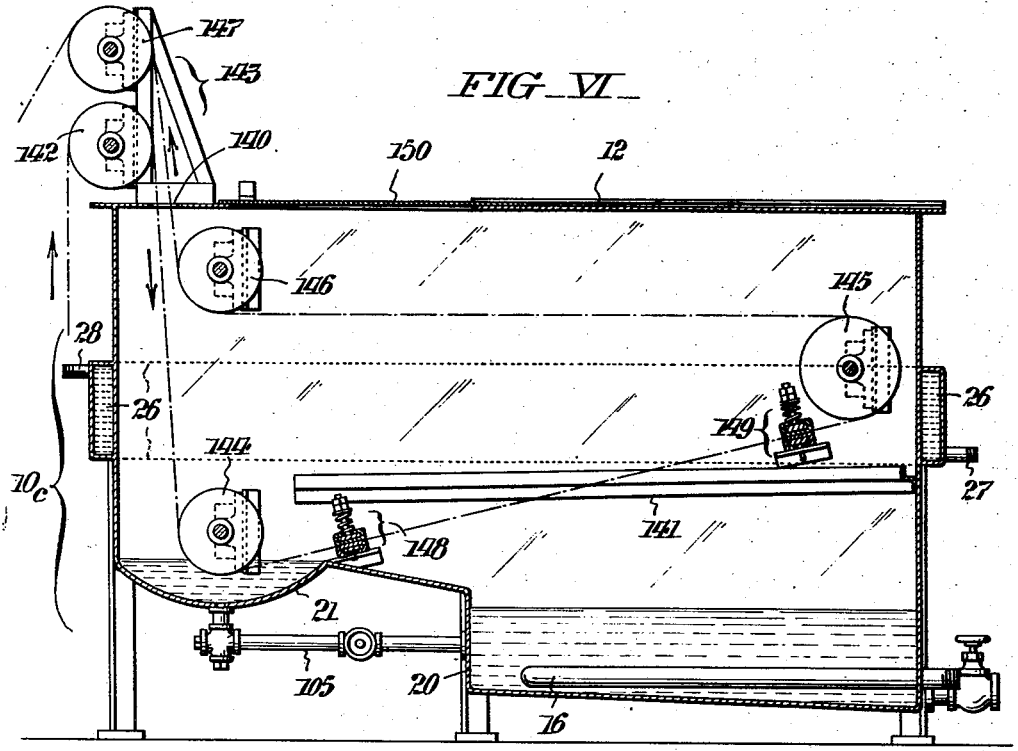
FIG. VI
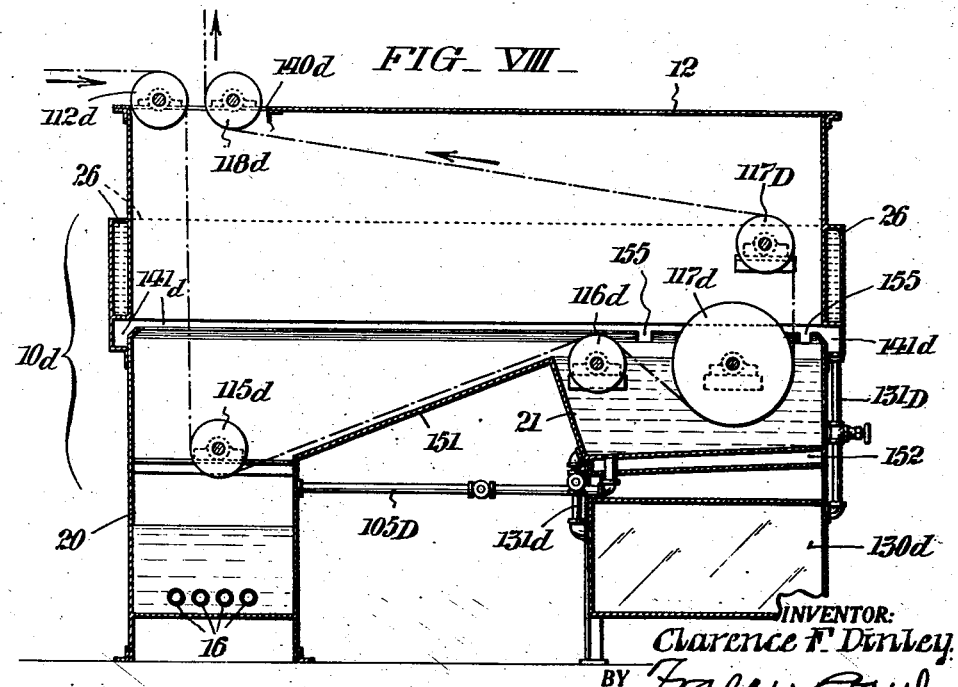
FIG. VIII
INVENTOR:
Clarence F. Dinley
BY
ATTORNEYS.

Dec. 14, 1937. C. F. DINLEY 2,101,840
DEGREASING APPARATUS
Filed Jan. 15, 1935 5 Sheets-Sheet 5
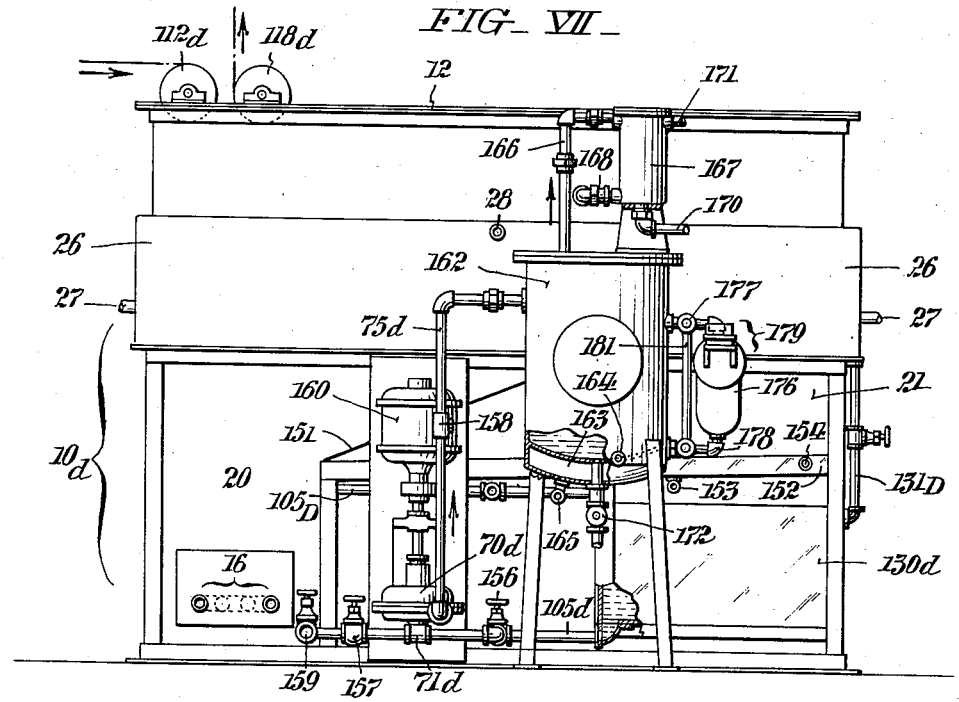
FIG. VII
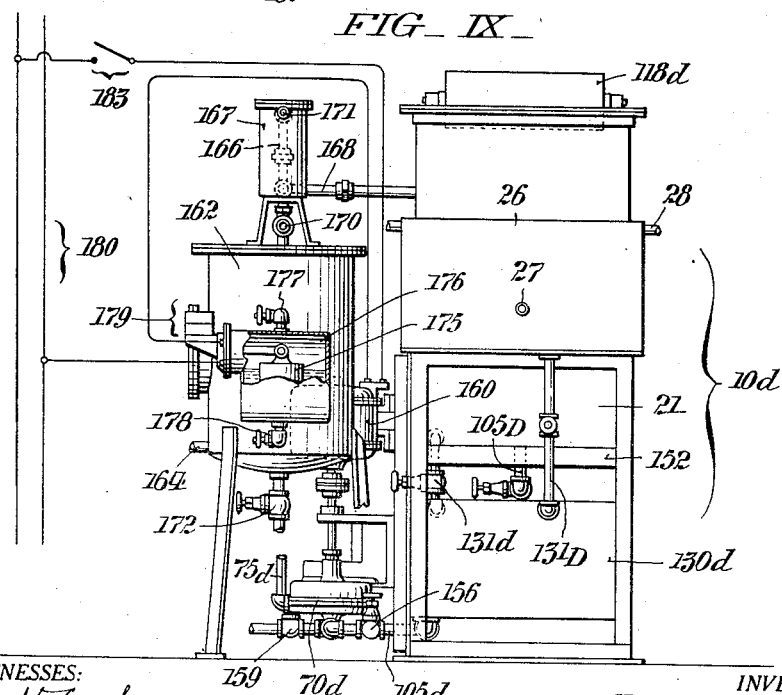
FIG. IX
INVENTOR:
Clarence F. Dinley Patented Dec. 14, 1937

2,101,840

UNITED STATES PATENT OFFICE 2,101,840

DEGREASING APPARATUS

Clarence F. Dinley, Detroit, Mich., assignor to James H. Bell, Philadelphia, Pa.

Application January 15, 1935, Serial No. 1,898

10 Claims. (Cl. 87—6)

My invention relates to treatment with solvents for such purposes as cleaning and degreasing, and to the use of volatile solvents. Various solvents whose vapors are heavier than air may be used, such as benzine, benzol, and chlorinated solvents like carbon tetrachloride, trichloromethane, tetrachloromethane, dichlorethane, tetrachlorethane, trichlorethylene, and tetrachlorethylene, whose vapors are uninflammable. The articles or work to be cleaned may be treated with the liquid solvent or with the solvent vapor, or both; and in many cases, treatment with hot or even boiling liquid solvent is desirable.

I aim especially at economizing solvent, and preventing or minimizing loss of its vapor from the treating vessel, even with the latter more or less open for the introduction and removal of work. In certain forms of embodiment of the invention hereinafter described, I minimize loss of solvent vapor by employing a treating vessel that has an opening (or openings) in its upper portion at or near one side (or end) for the introduction and withdrawal of work, but is otherwise substantially closed, so as to exclude air, retain solvent vapor, and prevent drafts into and out of the vessel. I also provide for condensing the vapor at a level or zone substantially below the work opening(s) above referred to, thus limiting the vapor to the lower portion of the vessel, below such level. Thus the closed-in upper portion of the vessel above the level in question affords a draft-free region in which work that has been cleaned in the subjacent solvent (vaporous or liquid) can be dried, and which serves to prevent loss of vapor through the opening(s). Provision may be made for mechanically passing work into, through, and out of the vessel via the work opening(s) in a definite or fixed course of travel,—although this is not broadly essential to the invention. In suitable forms of embodiment, such as hereinafter described, my invention affords a compact and efficient machine, wherein large quantities of work can be rapidly, thoroughly, and economically cleaned. Various other features and advantages of the invention will appear from the description hereinafter of species thereof, and from the drawings.

In the drawings, Fig. I is a side view of one form of apparatus suitable for the purposes of my invention, the main enclosure or treating vessel shown being for the most part in vertical section.

Fig. II is a similar view of another form of apparatus.

Fig. III shows a vertical section through the Fig. II apparatus at right angles to Fig. II, taken as indicated by the line and arrows III—III in Fig. II.

Fig. IV is a view similar to Figs. I and II illustrating yet another form of apparatus.

Fig. V shows a vertical section through the Fig. IV apparatus, taken as indicated by the line and arrows V—V in Fig. IV.

Fig. VI shows a vertical longitudinal section through yet another form of apparatus suitable for the purposes of my invention.

Fig. VII is a side view of still another form of apparatus embodying my invention.

Fig. VIII shows a vertical longitudinal section through the apparatus shown in Fig. VII.

Fig. IX is an end view of the apparatus shown in Fig. VII, from the right of Fig. VII.

The apparatus shown in Fig. I comprises a sheet metal treating vessel 10 that contains the solvent, whether used as liquid or as vapor, and is closed to exclude air and retain any solvent vapor that may be present,—purposely or incidentally,—but is open or apertured at its upper portion, as hereinafter explained, for the introduction and removal of work. In the particular apparatus shown in Fig. I, work is introduced and removed through a single opening 11 at one side or end of the vessel 10, in its (left-hand) side or end wall, and its top wall or roof 12 is unapertured. For passing the work in and out of or through the vessels 10 for treatment, there may, if desired, be a conveyor system 13, shown as of an endless chain-and-sprocket type, with a number of work carriers 14 at suitable intervals along the conveyor chains. Outside of the vessel 10, the conveyor system 13 travels in an irregular, horizontally elongated loop around guide means supported by a framework 15.

In general, work is treated with liquid or vaporous solvent (or both) in the lower portion of the vessel 10, while its upper portion serves mainly to prevent or minimize loss of solvent vapor from the vessel, especially in drying the work after treatment with the solvent. For when the solvent employed is highly volatile light gasoline or benzine; or when the work is immersed in the solvent while itself still hot or warm; or when the solvent is used hot or even boiled during use; or when the solvent is purposely used in the vapor state; or when the work is allowed to drain or dry in the upper portion of the vessel after treatment with the solvent;— in all such cases, solvent vapor will be present, and will tend to accumulate to the point of overflowing at the opening 11. When the solvent is to be used hot,—whether as liquid or as vapor,— it may be heated (and vaporized) in the lower portion of the vessel, by any suitable heating means, such as steam pipes or coils 16 there located. As shown in Figs. I and II, the vessel 10 has a plurality of distinct treating compartments or wells 20, 21, 22 separated by "dams" consisting of partition-like upward folds 23, 24 of the sheet metal forming the bottom of the vessel. In these several wells 20, 21, 22, articles or work may be more or less differently treated with the solvent. As here shown, also, the left-hand well 20 is provided with heating means, such as steam piping 16 near its bottom, for heating, vaporizing, or even boiling the liquid solvent in said well.

The escape of solvent vapor thus or otherwise present in the vessel 10 is prevented not only by the enclosure of its top at 12, and by condensation of vapor from its upper portion, as hereinafter explained, but also by both introducing and withdrawing the work at the same side of the vessel, at substantially or approximately the same point as represented by the opening 11, so that there can be no drafts of air across or through the top of the vessel 10, to cause eddies in the vessel and thus draw or force out the solvent vapor. Loss of solvent vapor can be further prevented or minimized by condensing the solvent vapor from or at a level substantially below the opening 11, and thereby limiting the accumulation of vapor in the vessel to its lower portion, below such level. Thus any vapor entering or arising in the draft-free upper portion of the vessel 10 will (being heavier than air) naturally gravitate into the lower portion of the vessel, without danger of escaping through the opening 11; and this upper portion of the vessel can be utilized to dry work after it has been treated with solvent in the lower portion of the vessel. While the external atmospheric cooling of the upper portions of the vessel walls will condense vapor in it, yet generally it is preferable to supplement or (largely) replace atmospheric cooling with more effective cooling means, so that the vessel 10 need not be so deep as mere atmospheric cooling would require. The particular type and arrangement of cooling means—whether internal or external, and whether on one side, two or more sides, or all around the vessel 10—is broadly immaterial, except that the greater the extent of the cooling means perimetrically of the vessel, the less its extent vertically need be to give adequate exposed cooling area. The solvent vapor, being heavier than air, will always flow by gravity toward the region or area where it is most rapidly cooled and condensed—just as if there were an actual outlet for the vapor at such region.

However, I have found that a particular general location of the cooling means is peculiarly advantageous in minimizing loss of solvent vapor at the opening 11: i. e., not on the same side of the vessel 10 as the opening 11 and the well 20 where solvent vapor is most profusely generated, but toward or at the opposite side of the vessel from opening 11 and well 20. Accordingly, the vessel walls are here shown as (externally) waterjacketed at 26 on three sides, above the wells 21 and 22—thus causing a continual gravity flow or draft of the vapor rising from well 20 away from that side of the vessel, over well 21, into and across through well 22—just or almost as if there were an actual outlet for the vapor in the right-hand side or end of the vessel 10. The jacket 26 has an inlet 27 for water or other cooling medium at its lower corner at one side of the vessel 10 and an outlet at its upper corner at the other side of the vessel 10 (not shown). The pure liquid solvent condensed by the cooling jacket 26 on the vessel walls runs down directly into the wells 21, 22. Such vapor as condenses on the vessel walls directly above the well 20 (by atmospheric cooling) runs down into well 20. Thus, it will be seen, well 20 normally contains (boiling) hot solvent about up to the level shown in Fig. I; well 21 normally contains relatively cool and pure condensed solvent to the level determined by the lower of dams 23, 24 (preferably the latter), as shown; and well 22 normally contains solvent vapor, as already explained.

As shown in Fig. I, the framework 15 includes uprights 30 against the left hand side of the vessel 10 (preferably at its corners), uprights or columns 31 at a suitable distance to the left of the vessel 10, horizontals 32 interconnecting the uprights 30, 31 a little below the top of the vessel 10, and sloping rafter-like members 33 interconnecting the upper ends of the uprights 30, 31. These various members 30, 31, 32, 33, may be braced at their points of attachment to one another by gusset plates 34. The upper portion of the vessel 10, including its roof 12 and the portions of its walls above the horizontal plane indicated by the reference numeral 35, may be made separate from the rest, as a sort of hood 36. This hood 36 may be separately supported, by attachment to the framework 15—as by attachment of the roof 12 to a horizontal angle interconnecting the uprights 30 at the front and rear left hand corners of the vessel, and by attachment of the upper portions of the rear and front walls of the vessel (the latter not shown in Fig. I) to the corresponding uprights 30. Thus the hood 36 may be supported from the framework 15 cantileverwise, virtually independently of the portions of the vessel 10 below the plane 35. As here shown, the portion of the vessel below the plane 35 is divided into sections at a lower horizontal plane, indicated by the reference numeral 37. The section 38 between the planes 35, 37 includes the waterjacket 26, while the lower section 39, below the plane 37, includes the various wells 20, 21, 22. The hood 36 and the sections 38 and 39 may preferably have external rims of angle sections welded thereto around their upper and lower edges; and when the sections are properly assembled, as shown, these rims may be secured together (vapor-tight) by any suitable means, such as welding, or bolting together with interposed gaskets.

The conveyor system 13 comprises a pair of endless sprocket chains 40, 40, suitably spaced from one another and traveling over a closed course that is determined by guide means mounted on the inner sides of the vessel 10 and on the framework 15. Outside the vessel 10, the loop of the conveyor system is determined by pairs of guide sprockets 41, 42, 43 whose shafts are mounted in suitable bearings on the framework 15. Of these, the upper outer sprockets 41 serve for adjusting the tension or tautness of the sprocket chains 40, 40, their bearing blocks 44 being mounted in vertical guideways 45 in which they may be set at any desired height by means of adjusting screws 46. From the right hand sprocket 43, the conveyor chains 40, 40 with their loaded carriers 14 make an upward pass followed by a reverse or "hairpin" turn in engagement with guide angles 49 mounted on the frame members 30, 32, over the upper edge of the vessel 10 at its opening 11. Then the conveyor chains 40, 40 pass downward inside the left hand wall of the vessel 10 around a hairpin or reverse turn angle guide 50, thus plunging the work on the carriers 14 into the liquid solvent in the well 20 and drawing it through the solvent to the right and upward. Under the guidance of similar angle bar guides 51, 52, 53, and a pair of sprockets 54, the conveyor chains 40 make successive upward and downward passes which carry the work into and through the liquid solvent in the well 21 and into and through the solvent vapor in the well 22. From the sprockets 54, the conveyor chains pass upward to sloping angle bar guides 55 just below the roof 12. The ends of these guides 55 are bent downward as shown in Fig. I to form suitable guiding curves for the necessary changes in direction of the chains 40. As shown in Fig. I, the conveyor system 13 may be driven by means of an (electric) motor 60 mounted on a bracket 61 attached to the framework of the lower vessel section 39, and driving through a speed reducing gearing 62 and a chain-and-sprocket connection 63 to a sprocket 64 on the shaft 65 of the conveyor chain sprockets 54. It will, of course, be understood that the sprocket 64 is arranged outside the vessel 10, to the rear in Fig. I, and that the shaft 65 penetrates the wall of the vessel section 37 through a suitable bearing or stuffing box 66.

For handling liquid solvent and transferring it from one part of the apparatus to another, as may be required, there is shown a system including a (rotary, centrifugal) pump 70 with a suction line 71 having connections to the bottoms of the wells 21, 22 controlled by suitable valves 72, 73, and a delivery line 75 having connections to or above the upper parts of the wells 20, 21, 22 (above their normal liquid levels in ordinary operation) controlled by valves 76, 77, 78. The suction connection 71 to the pump 70 is also shown as provided with an external intake connection controlled by a valve 79, which may be used when it is necessary to introduce additional solvent into the apparatus to make up for losses. By means of the pump 70 and its connections above described, liquid solvent can be transferred from either of the wells 21, 22 to any one of the three wells 20, 21, 22, as may be desired.

In ordinary operation, any liquid solvent overflowing from well 21 over dam 24 into the well 22 may be periodically drawn out,—so as to keep down the liquid in well 22 to the level shown in Fig. II,—and preferably returned to well 20. As a means for doing this automatically by proper operation of pump 70, by the (electric) motor 80 driving this pump, there is shown an (electric) float switch 83 connected to well 22 and responsive to the liquid level therein for controlling the supply of (electric) power to the motor 80.

While various modes of operation and use of the apparatus will be apparent from the foregoing description, one preferred mode of operation is as follows:

The wells 20, 21 having been initially filled with pure liquid solvent such as trichlorethylene about to the levels shown in Fig. I, and steam being supplied to the pipes 16, the solvent in well 20 may be heated up to any temperature desired for treating the work, and even kept boiling. Vapor rising from the solvent in well 20 will rise above dams 23, 24 and spread or flow toward the right (by gravity) into well 22, displacing the (lighter) air. Water (or other cooling medium) will be circulated through the jacket 26. As the accumulating vapor in the vessel 10 reaches the cool area produced by the jacket 26, it will begin to condense, and will thus be prevented from rising more than about mid-height of this condenser 26,—and a fortiori, from overflowing or escaping from the open vessel 10,—since the vapor is heavier than air. In other words, the condenser at 26 will draw and keep down the vapor level well below the opening at 11, leaving a draft-free region or air space in the upper portion of the vessel, as already described.

The endless conveyor system 13, driven by the motor carries the work to the right in the lower portion of the enclosure 10, below the vapor level at the condenser 26. In the well 20, the work is initially cleaned of grease and dirt by the (hot) solvent. In the well 21, any dirty solvent clinging to the work is rinsed off by the much purer and cooler condensed solvent supplied thereto from the condenser 26. Having been heated up in well 20 by the hot solvent and cooled off again considerably in well 21, the work enters well 22 cooler than the vapor in the latter, which therefore condenses on the work and thus rinses it exceedingly clean of any last traces of grease. Ascending from the well 22, the work dries off by the time it leaves the vessel 10 via the opening 11. The clean work can be removed from the carriers 14 and replaced with other work to be cleaned—or the carriers 14 themselves may be removed and replaced with other carriers already loaded with dirty work—while the carriers are traveling along the lower external run of the conveyor system, between the sprockets 42 and 43.

During the return travel of the carriers 14 with their loads of clean work from the condenser 26 upward and then to the left and upward beneath the roof 12, above the vapor level at the condenser 26, there is ample opportunity for solvent to drain and dry off from the work, which will have been thoroughly heated up by contact with the solvent vapor in the well 22. This is especially desirable in the case of work having recesses in which solvent from the wells 20, 21, 22 may collect, because the dwell of the cleaned work in the upper part of the vessel permits such solvent to evaporate there, instead of being carried out into the atmosphere and lost. Being heavier than air, the solvent dripping or evaporating from the work during its travel upward and to the left falls or sinks by gravity into the bulk of solvent vapor in the vessel 10, without any appreciable loss at the opening 11, since drafts which might carry the vapor out of the vessel through the opening 11 are precluded by the enclosure of the upper portion of the vessel on all other sides.

The apparatus shown in Figs. II and III differs from that of Fig. I in that the conveyor system 13a does not actually leave the enclosure 10a, but instead makes a downward pass just inside the left-hand side or end wall of the enclosure, which has an opening 11a with a door 90 through which the clean work (or the carriers 14 loaded therewith) can be removed from the conveyor and replaced with dirty work. The door 90 is shown closed, but may be normally kept open during the ordinary operation of the apparatus. The enclosure 10 is shown as made in lower and upper sections 91, 92, the latter of which can be lifted off when detached from the lower. This upper section 92 includes the opening 11a and its door 90, while the lower section 91 includes the condenser 26 as well as the wells 20, 21, 22. The condenser 26 (with inlet 27 and outlet 28) is toward the right of the enclosure 10, over the wells 21, 22, and both limits the vapor level and draws the vapor away from the opening 11a substantially as in Fig. I. Accordingly, there is a draft-free space in the upper portion of the enclosure 10a, above the vapor level at the condenser 26, that prevents escape of solvent vapor at opening 11a and allows of drying the work during its return travel to the left above the vapor. The action during the travel of the work to the right below the vapor level is like that in Fig. I. The well 20 contains (electric) heating elements 16a, and the guides 51, 53 of Fig. I are replaced by (idle) sprockets 51a, 53a.

To provide for adjusting the tension of the conveyor chains 40, 40, the shaft 96 of two of the sprockets that guide their upper, return run may be made horizontally adjustable. For this purpose, the shaft 96 extends out through slots 97 in the enclosure walls to bearings 98 that are adjustable along guideways 99 outside the enclosure, by means of adjusting screws 100. The enclosure walls may be strengthened with external angle framing, to assist in sustaining the stresses on the shaft bearings for the various sprockets and guides. As shown, the lower vessel section 91 has a horizontal angle frame 101 on which the condenser 26 engages, and has angle corner braces and legs 102 by which it is supported from the floor. Additional underframing for the section 91 includes angles 103 that support the bottoms of the wells 20, 21, 22. The conveyor driving motor 60a and its speed reducer 62 are shown mounted on horizontal angle framing 104 attached to the legs 102 near their lower ends. The provisions for transferring solvent include a valved return pipe 105 from the bottom of well 22 to well 20, and a (gear) pump 106 with a valved suction connection 107 to the bottom of well 21 and a delivery connection 108 delivering just above well 20. The connection 107 also includes a valved external intake 109 suitable for the introduction of additional solvent into the apparatus to make up for losses during operation.

In Figs. II and III, various parts and features are marked with the same reference numerals as in Fig. I,—with an annexed letter where such distinction seems necessary,—as a means of dispensing with repetitive description. The general operation and internal conditions in the apparatus of Figs. II and III are similar to what occur in that of Fig. I.

The apparatus shown in Figs. IV and V differs from those of Figs. I-III in having only two solvent wells, a boiling well 20 and a purified solvent rinse well 21, over which is the condenser 26. This particular apparatus is especially adapted for cleaning strands or sheets—as of wire, sheet metal, wire cloth or screening, etc., etc.,—which enters and leaves the vessel or enclosure 10b through horizontal entrance and exit slots 110, 111 in the left-hand end of the enclosure near its top,—the upper portion of the enclosure projecting or overhanging a little beyond the lower portion at this end. The entering work passes from a supply or approach guide roll 112 (which is mounted in bearings 113 on an angle bar frame projecting to the left from the enclosure 10b); between two spring-actuated scrapers 113X, 113Y which rub off loosely adherent dirt; through the entrance opening 110; over and around a guide roll 114 and downward nearly to (or into) the liquid solvent in the well 20; under and around a guide roll 115 in well 20; up over and around a guide roll 116 over the left-hand end of well 21; down under and around a guide roll 117 that dips into the liquid solvent in well 21; upward and to the left through the upper portion of the enclosure 10; and out through opening 111, and over and around an external guide roll 118 whose trunnions or axis is mounted in bearing brackets 119 attached to the outer left-hand wall of the enclosure. The work may be drawn through the apparatus by any suitable means, which need not necessarily be the roll 117 or other part of the apparatus itself. As shown, the guide roll 115 in well 20 has its axis bearings 120 mounted for vertical adjustment along ways 121, so that the sheet material or work may either run through the liquid in well 20 or pass over it through the vapor.

As shown in Figs. IV and V, the vessel or enclosure 10b is divided into lower and upper sections 122, 123 very much as in Figs. II and III. The lower section 122 includes wells 20, 21 and condenser 26, while the upper section 123 includes the openings 110, 111 and the supporting means for the bearings of all the internal roll axes, as well as for the bearings of the external roll 118. For this purpose, there are angle bar side frames 124, 124 whose upper horizontal angle members 125, 125 are welded to the upper flanges of horizontal angle bars 126, 126 which are themselves welded to the inner sides of the walls of the upper vessel section or cover 123.

As shown in Figs. IV and V, the apparatus includes a solvent storage tank 130 underneath the well 21, with a valved pipe connection 131 to said tank from the bottom of well 21. For returning solvent from tank 130 into the vessel 10, there is a (gear) pump 132 with a valved suction connection 133 to the bottom of tank 130 and a delivery connection 134 into the vessel 10 just above well 20. There is also shown a thermometer 135 extending into well 21 and out through the side of the vessel 10, to allow the temperature of the solvent in the well 21 to be read whenever desired during the operation of the apparatus. As shown, the heating pipes or coils 16 are mounted on a cover 136 detachably secured over an opening in a lateral wall of well 20, so that they can be removed and the well more easily cleaned.

In Figs. IV and V, various parts and features have been marked with the same reference numerals as in Figs. I-III,—with an annexed letter, where such distinction appears necessary,—as a means of dispensing with repetitive description.

In this apparatus, besides the draft-free space in the upper portion of the enclosure or vessel 10b, above the vapor level at the condenser 26, and the draft of solvent vapor from well 20 toward condenser 26 and away from openings 110, 111, the traveling work itself offers an obstacle to drafts toward the left which might tend to carry vapor to the openings 110, 111. This is especially so in the case of sheet metal or other impervious material, which act as a condensing blanket and doubly curtains off or occludes the left-hand end of the enclosure by its downward run between rolls 114, 115 and its upward return run between rolls 117, 118. The general action and conditions in the apparatus are similar to those in Figs. I-III.

The apparatus shown in Fig. VI is likewise specially adapted for treating strands or sheets of wire, wire weave, screening, or sheet metal, etc., etc. Here, however, the work enters and leaves the vessel 10c through a common slot 140 in its top or roof 12, which is at the opposite end of the vessel 10 from the well 20 where the solvent is heated and vaporized. In this instance, the condenser 26 entirely girdles the vessel 10, and a trough or gutter 141 extends around most of three sides of the vessel 10, to catch solvent condensing on the vessel walls above well 20. This trough 141 slopes downward to the left and delivers the condensate into the purified solvent rinse well 21.

The approaching work ascends and makes a hairpin turn over a (lower) guide roll 142 mounted in bearings on a bracket 143 on the cover 12, and then descends through opening 140 into the vessel 10. Descending into the liquid solvent in well 21, it passes under and around a guide roll 144, and thence makes an upward-sloping run to the right over well 20, to a guide-roll 145 in the right-hand end of the vessel, about on a level with the top of condenser 26. It then makes a horizontal run to the left in the top of the vessel 10c, above the vapor level therein as determined by condenser 26, to a guide roll 146. Passing under and around the roll 146, the work passes up through opening 140 to an (upper) guide roll 147 mounted in bearings in bracket 143, and then passes over and around this roll 147.

In its pass from roll 144 to roll 145, the work passes between two spring-actuated rubbers 148, 149 which rub off or loosen any dirt clinging to it, so that the thus bared metal may be more effectively acted on by the solvent condensing on the metal over well 20. In its travel from roll 145 to roll 146, the work is above the vapor, and the solvent clinging to it drips off or evaporates, and gravitates (being heavier than the air in the top of the vessel 10) into the vapor beneath. Thus the work emerges at 140 perfectly clean and dry, and all loss of solvent is avoided. Indeed, the two runs of the relative cool work from roll 144 to roll 145 and back to roll 146 form a double condensing blanket interposed and occluding the interior of the enclosure 10c between well 20 (where solvent is vaporized) and opening 140, effectually preventing any drafts, or eddies in the vessel 10 from carrying vapor upward to opening 140. In general, the action and conditions in this apparatus are similar to what takes place in Figs. I–V.

As shown in Fig. VI, there is an opening in the enclosure roof or cover 12 that can be closed by means of a sliding cover 150. This opening facilitates inspection of the interior of the apparatus, and also affords convenient access for cleaning, passing sheets or strands around the guide rolls, etc.

In Fig. VI, various parts and features are marked with the same reference numerals as in Fig. I (with added letters where such distinction appears necessary) as a means of dispensing with repetitive description.

The apparatus shown in Figs. VII, VIII and IX resembles those of Figs. IV, V and VI, being especially adapted for cleaning strands or strips of wire or of sheet metal, wire cloth or screening, or other sheet material. The strands or strip to be treated may enter and leave the vessel or enclosure 10d through a common slot 140d in its top or roof 12 at its left-hand side or end, above the solvent heating or boiling well 20, around (idle) guide rolls 112d, 118d mounted side by side in or above the opening 140d. Referring especially to Fig. VIII, it will be seen that from the supply or approach roll 112d, the course of the work is like that in Fig. IV, except that from guide roll 117d in well 21 the work passes up around and over a superjacent guide roll 117D (shown as about level with the top of the water-jacket condenser 26), on its way to the exit guide roll 118d. As here shown (Figs. VII and VIII), the bottom wall 151 of the vessel 10d between the wells 20 and 21 extends on a slope parallel with the run of the work between rolls 115d and 116d, and in close proximity thereto,— so that the solvent overflow from well 21 down the sloping "spillway" wall 151 washes this ascending run of the work, preferably on both its under and upper sides. To minimize friction, actual contact of the work with the spillway 151 may be avoided: as shown, the clearance between them is exaggerated for the sake of clearness of illustration. Besides the heating means 16 for the solvent in well 20, means are preferably provided for also heating the (purified) solvent in well 21, consisting as shown of a heating jacket 152 on the well bottom through which a heating fluid (such as water or steam) may be circulated via inlet and outlet connections 153, 154. By means of the jacket 152 or other suitable heating means, the solvent in well 21 may be kept at as high a temperature as desired,—though ordinarily below the vaporizing (boiling) temperature usually maintained in well 20.

As shown in Fig. VIII, the condenser 26 and the trough or gutter 141d for catching the condensed solvent extend all the way around the vessel 10d on all sides. This condensate trough 141d lies directly beneath the condensing jacket 26, and is open into the interior of the vessel 10d through a slot in the vessel wall. The trough 141d has an inward flaring or projecting upper portion or lip formed by deflection of the vessel wall (below the slot) inward beyond its general plane. From this trough 141d the condensate may ordinarily overflow or run off into the well 21, as through notches 155 in the inward-sloping upper portion of the inner trough wall, directly over the well 21. Directly under the well 21 and its heating jacket 152, there is shown a purified solvent storage tank or reservoir 130d, preferably of sufficient capacity to contain all the solvent normally used in the vessel 10d. This reservoir 130d may have a valved pipe connection 131d to the bottom of well 21, and also a valved "by-pass" pipe connection 131D to the bottom of the solvent trough 141d. When either of these connections is open sufficiently, all or part of the condensate runs into reservoir 130d.

The ordinary operation of the apparatus of Figs. VII–IX resembles that of the Figs IV and V apparatus, and need not be specially described. However, the heating of the solvent in well 21 allows of treating the work with purified solvent at any temperature up to boiling; and the contact of the solvent flow from 21 to 20 with the work travelling from 20 to 21 washes off most of the dirt from the work before the latter reaches well 21, so that contamination of the solvent in the latter is prevented or minimized. In other words, most of the dirt accumulates in well 20 and only a very little in well 21. When cleaning of well 20 (or/and 21) becomes necessary, it is only necessary to open the valved connection 131D and heat the solvent in wells 20 and 21 to boiling, thus distilling practically all the solvent into trough 141d and reservoir 130d, whereupon the apparatus may be opened, and the wells 20 and 21 thoroughly cleaned out.

Thereafter the pure solvent may be returned from reservoir 130d to well 20 by means and connections similar to those of Figs. I and II, including a return pipe 105d from the bottom of reservoir 130d to that of well 20, with valves 156, 157 therein, and a pump 70d with suction connection 71d to pipe 105d between valves 156 and 157, and a delivery connection 75d, with an anti-return check valve 158 therein. There is also a valved return pipe 105D from the bottom of well 21 to well 20, and a valved draw-off or drainage connection 159 from the pipe 105d aforesaid. As shown, the pump 70d is a centrifugal pump with its axis and shaft upright, and is driven by an (electric) motor 160 directly connected to the shaft.

Purification of the solvent as just described can be effected more rapidly than in Figs. I-V, because with this apparatus solvent can be concurrently distilled from both of wells 20 and 21 by their respective heating means 16 and 152. Whereas in Figs. I-V only well 20 with its heating means 16 can be used to vaporize the solvent; for in Figs. I and II, both of wells 21 and 22 are needed to contain the pure condensate when practically all the solvent in well 20 is boiled off; and in Fig. IV, well 21 must be used to collect the condensate that runs into reservoir 130.

However, Figs. VII and IX show other means for purifying the solvent used in the apparatus, arranged conveniently alongside the vessel 10d. For this purpose, there is an evaporator or boiler 162 provided with heating means such as a bottom jacket 163 with inlet 164 and outlet 165 for steam or other heating medium, and connected to the delivery pipe 75d of the pump 70d. The solvent vapor generated in the boiler 162 passes up through a pipe 166 into a "water-tube" surface condenser 167 conveniently mounted above the top of the boiler; and the condensed and purified solvent is returned into the vessel 10d from the bottom of the condenser 167 through a pipe 168, at a point above the well 21 and the work-run between the rolls 115d and 116d. Water or other cooling medium may be circulated through the tubes of condenser 167 via inlet and outlet connections 170, 171. The grease and dirt accumulating in the bottom of boiler 162 may be drawn off from time to time through a valved drainage connection 172, shown as extending up through the heating jacket 163.

Provision may be made for controlling or regulating the action of the pump 70a automatically according to the liquid solvent level in the boiler 162. For this purpose, a float switch responsive to the liquid solvent level may be used. As shown, the float 175 is in a separate chamber 176 having connections 177, 178 to the liquid and vapor spaces of the boiler; and the switch 179 operated by the float makes and breaks the electric power supply circuit 180 to the pump motor 160. A gauge glass 181 for showing the liquid level in boiler 162 is shown connected between the float chamber connections 177, 178, with the usual shut-off valves to be closed when the gauge glass requires cleaning out, or if it should break. The float 175 closes the circuit 180 and starts the pump 70d to transfer solvent from tank 130d to boiler 162 whenever the liquid level in the boiler falls below a certain level; and when this liquid level has been restored, the float opens this circuit and stops the pump. The power circuit 180 may also be provided with a manual control switch 183.

The external solvent purifying system just described—comprising the still consisting of boiler 162 and condenser 167—may be operated or used in various ways, either intermittently, while cleaning of work in the apparatus is suspended, or continuously while work is being cleaned.

For example, to purify the solvent while treatment of work is suspended, the valved connection 131D from trough 141d to storage tank 130d may be left closed, and the connection 131d opened to drain the well 21 freely into the storage tank 130d. When all (or substantially all) the solvent in well 20 has been distilled over into well 21 and run in tank 130d,—thus washing out the bottom of well 21,—the valved connection 131d and the power switch 183 may be closed, and the solvent in tank 130d thus passed through the still 162, 167 and returned into well 21 while well 20 is being cleaned out.

Or to purify the solvent continuously while treatment of work goes on uninterrupted, the valved connection 131d may be opened sufficiently to let the solvent in the bottom of well 21 run off slowly into tank 130d while overflow at 151 continues,—thus allowing dirt in the bottom of well 21 to run into the tank 130d,—while valved connection 131D remains closed. In this way, the solvent in well 21 will be continuously purified and returned to fall on the run of work between rolls 115d and 116d and assist in washing it; and dirt will accumulate only in well 20. This mode of operation is especially adapted to the treatment of work with adherent greasy dirt that requires prolonged soaking in well 21 to loosen and remove it.

In Figs. VII-IX, various parts and features are marked with the same reference numerals as in other figures,—with an added letter where such distinction appears necessary,—as a means of dispensing with repetitive description.

Having thus described my invention, I claim:

1. Apparatus of the character described, for treating articles or work with volatile solvent whose vapor is heavier than air, comprising in combination a treating vessel or enclosure adapted to contain volatile liquid solvent and its vapor, and apertured and open for the introduction and withdrawal of work directly into and from its upper portion at one side thereof only, but otherwise covered over and substantially closed, so as to prevent drafts into and out of the vessel while at the same time permitting introduction and withdrawal of work at the work opening above referred to; cooling means for maintaining in the vessel a cool vapor-drawing condensing zone at a level substantially below its work opening above referred to, so that the closed-in portion of the vessel above said level affords a draft-free region in which work cleaned with the solvent below said level may be dried before withdrawal from the vessel, without resulting loss of solvent vapor through the opening; and an endless conveyor traveling a course from the opening above referred to down below said condensing zone, and also through said drying region and back to the work opening.

2. Apparatus of the character described, for treating articles or work with volatile solvent whose vapor is heavier than air, comprising in combination a treating vessel or enclosure adapted to contain volatile liquid solvent and its vapor, and apertured and open for the introduction and withdrawal of work directly into and from its upper portion at one side thereof only, but otherwise covered over and substantially closed, so as to prevent drafts into and out of the vessel while at the same time permitting ingress and egress of work as hereinafter mentioned; cooling means for maintaining in the vessel a cool vapor-drawing condensing zone at a level substantially below its work opening above referred to, so that the closed-in portion of the vessel above said level affords a draft-free region in which work cleaned with the solvent below said level may be dried before withdrawal from the vessel, without resulting loss of solvent vapor through the opening; and means for passing and guiding work into, through, and out of the vessel, covered as aforesaid, via the work opening above referred to, with travel through said drying region and also below said condensing zone.

3. Apparatus of the character described, for treating articles or work with volatile solvent whose vapor is heavier than air, comprising in combination a treating vessel or enclosure adapted to contain volatile liquid solvent and its vapor, and apertured and open for the introduction and withdrawal of work directly into and from its upper portion at one side thereof only, but otherwise covered over and substantially closed, so as to prevent drafts into and out of the vessel; cooling means for maintaining in the vessel a cool vapor-drawing condensing zone at a level substantially below its work opening above referred to, so that the closed-in portion of the vessel above said level affords a draft-free region in which work cleaned with the solvent below said level may be dried before withdrawal from the vessel, without resulting loss of solvent vapor through the opening; and means for passing and guiding work into, through, and out of the vessel via the work opening above referred to, in a course away from the opening through the lower portion of the vessel and returning thereto through the upper portion of the vessel, above the level of said condensing zone.

4. Apparatus of the character described, for treating articles or work with volatile solvent whose vapor is heavier than air, comprising in combination a treating vessel or enclosure adapted to contain volatile liquid solvent and its vapor, and apertured and open for the introduction and withdrawal of work directly into and from its upper portion at one side thereof only, but otherwise covered over and substantially closed, so as to prevent drafts into and out of the vessel; cooling means for maintaining in the vessel a cool vapor-drawing condensing zone at a level substantially below its work opening above referred to, so that the closed-in portion of the vessel above said level affords a draft-free region in which work cleaned with the solvent below said level may be dried before withdrawal from the vessel, without resulting loss of solvent vapor through the opening; and an endless conveyor entering the vessel through the lower part of said opening and leaving it through the upper part thereof, and travelling in an elongated unloading and loading loop outside the vessel, and within the vessel travelling away from the opening through the lower portion of the vessel and returning to the opening through the upper portion of the vessel, above the level of said condensing zone.

5. Apparatus of the character described, for treating articles or work with volatile solvent whose vapor is heavier than air, comprising in combination a treating vessel or enclosure adapted to contain volatile liquid solvent and its vapor, and apertured and open for the introduction and withdrawal of work directly into and from its upper portion at one side thereof only, but otherwise covered over and substantially closed, so as to prevent drafts into and out of the vessel, said vessel having in its lower portion a plurality of wells, one at the same side of the vessel as its work opening above referred to, and another further away from said side; means for heating and vaporizing liquid solvent in said first-mentioned well; and condensing means over said other well, at a level substantially lower than said work opening, for drawing away and condensing the solvent vapor evolved in the well first above mentioned, and thereby supplying said other well with purified liquid solvent and keeping down the vapor level in the vessel substantially to said means, so that the closed-in portion of the vessel above said level affords a draft-free region in which work cleaned with the solvent below said level may be dried before withdrawal from the vessel, without resulting loss of solvent vapor through the opening.

6. Apparatus of the character described, for treating articles or work with volatile solvent whose vapor is heavier than air, comprising in combination a treating vessel or enclosure adapted to contain volatile liquid solvent and its vapor, and apertured and open for the introduction and withdrawal of work directly into and from its upper portion at one side thereof only, but otherwise covered over and substantially closed, so as to prevent drafts into and out of the vessel; cooling means for maintaining in the vessel a cool vapor-drawing condensing zone at a level substantially below its work opening above referred to, so that the closed-in portion of the vessel above said level affords a draft-free region in which work cleaned with the solvent below said level may be dried before withdrawal from the vessel, without resulting loss of solvent vapor through the opening; and means for passing sheet material into, through, and out of the vessel via the work opening above referred to, in a course within the vessel interposing between the said work opening and the region of evolution of solvent vapor in the lower portion of the vessel.

7. Apparatus of the character described, for treating articles or work with volatile solvent whose vapor is heavier than air, comprising in combination a treating vessel or enclosure adapted to contain volatile liquid solvent and its vapor, and apertured and open for the introduction and withdrawal of work directly into and from its upper portion at one side thereof only, but otherwise covered over and substantially closed, so as to prevent drafts into and out of the vessel, said vessel having in its lower portion a plurality of wells, one at the same side of the vessel as its work opening above referred to, and the other further away from said side; means for heating and vaporizing liquid solvent in one of said wells; and cooling means for maintaining in the vessel a cool vapor-drawing condensing zone at a level substantially below its work opening above referred to, so that the closed-in portion of the vessel above said level affords a draft-free region in which work cleaned with the solvent below said level may be dried before withdrawal from the vessel, without resulting loss of solvent vapor through the opening; and means for passing sheet material into, through, and out of the vessel via the work opening above referred to, with runs within the vessel interposed and overlapping one another between said work opening and the well with said heating means, and with travel through the solvent vapor below said level.

8. Apparatus of the character described, for treating work with volatile solvent whose vapor is heavier than air, comprising in combination an air-excluding treating vessel or enclosure open to the atmosphere for introduction and removal of work, and provided with means affording separate solvent wells in said vessel, with an intervening spillway, and permitting accumulation of liquid solvent in one of said wells higher than the solvent level in another and overflow of excess from the one well via said spillway into the other well, and also provided with means above said wells, but below where the vessel is open as aforesaid, for retaining and condensing solvent vapor evolved in the vessel and thus preventing its overflow from the apparatus, and for thereby supplying said overflowing well with liquid solvent; and means for passing work to be treated through the vessel and along said spillway so that the work may be washed with the flowing solvent on the spillway.

9. Apparatus of the character described, for treating work with volatile solvent whose vapor is heavier than air, comprising in combination an air-excluding treating vessel or enclosure open to the atmosphere for introduction and removal of work, and provided with means affording separate solvent wells in said vessel, with an intervening spillway, and permitting accumulation of liquid solvent in one of said wells higher than the solvent level in another and overflow of excess from the one well via said spillway into the other well, and also provided with means above said wells for retaining and condensing solvent vapor evolved in the vessel and thus preventing its overflow from the apparatus, and for thereby supplying said overflowing well with liquid solvent; and means for passing work to be treated through the vessel and upward along said spillway from the well receiving the overflow to the overflowing well and through the liquid solvent in the latter, so that the ascending work may be washed by the downflow of solvent on the spillway and contamination of the overflowing well from the work thus minimized.

10. Apparatus of the character described, for treating work with volatile solvent whose vapor is heavier than air, comprising in combination an air-excluding treating vessel or enclosure open to the atmosphere for introduction and removal of work, and provided with means affording separate solvent wells in said vessel, and permitting accumulation of liquid solvent in one of said wells higher than the solvent level in another and overflow of excess from the one well into the other well, and also provided with means above said wells for retaining and condensing solvent vapor evolved in the vessel and thus preventing its overflow from the apparatus, and for thereby supplying said overflowing well with liquid solvent; a storage reservoir for liquid solvent, and means for passing solvent from said overflowing well into said reservoir; means for by-passing condensed liquid solvent from said condensing means past said overflowing well to said reservoir; and means for passing liquid solvent from said storage reservoir to distilling means therefor outside said vessel, and for returning the condensate from said distilling means to said overflowing well.

CLARENCE F. DINLEY.